United States Patent
Stec et al.

(10) Patent No.: US 11,046,327 B2
(45) Date of Patent: Jun. 29, 2021

(54) SYSTEM FOR PERFORMING EYE DETECTION AND/OR TRACKING

(71) Applicant: FotoNation Limited, Galway (IE)

(72) Inventors: Piotr Stec, Galway (IE); Petronel Bigioi, Galway (IE)

(73) Assignee: FotoNation Limited, Galway (IE)

( * ) Notice: Subject to any disclaimer, the term of this patent is extended or adjusted under 35 U.S.C. 154(b) by 0 days.

(21) Appl. No.: 16/719,686

(22) Filed: Dec. 18, 2019

(65) Prior Publication Data

US 2020/0324780 A1 Oct. 15, 2020

Related U.S. Application Data

(63) Continuation-in-part of application No. 16/379,348, filed on Apr. 9, 2019, now Pat. No. 10,948,986.

(51) Int. Cl.
*B60W 40/09* (2012.01)
*G06T 7/73* (2017.01)
(Continued)

(52) U.S. Cl.
CPC ............... *B60W 40/09* (2013.01); *B60Q 3/18* (2017.02); *B60R 11/04* (2013.01); *G06F 3/013* (2013.01);
(Continued)

(58) Field of Classification Search
CPC ............................. B60W 40/09; G06F 3/013
See application file for complete search history.

(56) References Cited

U.S. PATENT DOCUMENTS

| 5,572,596 A | 11/1996 | Wildes et al. |
| 7,488,073 B2 | 2/2009 | Kandel et al. |

(Continued)

FOREIGN PATENT DOCUMENTS

| DE | 19803158 C1 | 5/1999 |
| DE | 10359125 A1 | 7/2005 |

(Continued)

OTHER PUBLICATIONS

T.-W. Huang, M.-L. Ko, Y. Ouyang, Y.-Y. Chen, B.-S. Sone, M. Ou-Yang, J.-C. Chiou, "An improved apparatus of infrared videopupillography for monitoring pupil size", Infrared Sensors, Devices, and Applications IV, edited by Paul D. LeVan, Ashok K. Sood, Priyalal Wijewarnasuriya, Arvind I. D'Souza, Proc. of SPIE vol. 9220, 92200T, 2014 SPIE •doi: 10.1117/12.2062059, 7 pages.

(Continued)

*Primary Examiner* — Jerry T Jean Baptiste
(74) *Attorney, Agent, or Firm* — Lee & Hayes, P.C.

(57) ABSTRACT

This disclosure describes, in part, systems and techniques for performing eye tracking. For instance, a system may include a first imaging device that generates first image data. The system may then analyze the first image data to determine a location of a face of a user. Using the location, the system may cause an actuator to move from a first position to a second position in order to direct a second imaging device towards the face of the user. While in the second position, the second imaging device may generate second image data representing at least the face of the user. The system may then analyze the second image data to determine a gaze direction of the user. In some instances, the first imaging device may include a first field of view (FOV) that is greater than a second FOV of the second imaging device.

21 Claims, 6 Drawing Sheets

(51) Int. Cl.
*B60Q 3/18* (2017.01)
*B60R 11/04* (2006.01)
*G06F 3/01* (2006.01)
*G06K 9/00* (2006.01)
*B60R 11/00* (2006.01)
*B60W 40/08* (2012.01)

(52) U.S. Cl.
CPC ..... *G06K 9/00604* (2013.01); *G06K 9/00845* (2013.01); *G06T 7/74* (2017.01); *B60R 2011/0085* (2013.01); *B60W 2040/0818* (2013.01); *B60W 2540/229* (2020.02); *G06T 2207/30201* (2013.01)

(56) References Cited

U.S. PATENT DOCUMENTS

| | | | |
|---|---|---|---|
| 7,670,002 | B2 | 3/2010 | Stark et al. |
| 10,357,195 | B2 | 7/2019 | Beck et al. |
| 2003/0118217 | A1 | 6/2003 | Kondo et al. |
| 2011/0228975 | A1 | 9/2011 | Hennessey et al. |
| 2012/0300978 | A1* | 11/2012 | Eberl ............... G09G 5/00 382/103 |
| 2013/0063582 | A1* | 3/2013 | Choi ............ G06K 9/00604 348/78 |
| 2014/0055342 | A1 | 2/2014 | Kamimura et al. |
| 2014/0267021 | A1 | 9/2014 | Lee et al. |
| 2015/0002650 | A1 | 1/2015 | Yoshimura et al. |
| 2016/0048964 | A1* | 2/2016 | Kruglick ........... G06K 9/00671 345/633 |
| 2016/0210503 | A1* | 7/2016 | Yin ................. G06K 9/00335 |
| 2017/0134643 | A1 | 5/2017 | Kim et al. |
| 2019/0324276 | A1* | 10/2019 | Edwin .................. G09G 5/003 |
| 2019/0364229 | A1 | 11/2019 | Stec et al. |
| 2020/0326773 | A1 | 10/2020 | Bigioi et al. |

FOREIGN PATENT DOCUMENTS

| | | |
|---|---|---|
| DE | 102013221188 A1 | 4/2015 |
| WO | WO2013036632 | 3/2013 |

OTHER PUBLICATIONS

Charlotte A. Hall and Robert P. Chilcott, "Eyeing up the Future of the Pupillary Light Reflex in Neurodiagnostics", Diagnostics 2018, 8, 19; doi:10.3390/diagnostics8010019, 20 pages.

Lily Yu-Li Chang, Jason Turuwhenua, Tian Yuan Qu, Joanna M. Black and Monica L. Acosta, "Infrared Video Pupillography Coupled with Smart Phone LED for Measurement of Pupillary Light Reflex", Frontiers in Integrative Neuroscience, Mar. 7, 2017, https://doi.org/10.3389/fnint.2017.00006, 18 pages.

K. Rózanowski and K. Murawski, "Optical Sensor to Monitor Pupillary Light Reflex", Optical and Acoustical Methods in Science and Technology 2013, Acta Physica Polonica A, vol. 124 (2013), No. 3, pp. 558-562.

Brian O'Sullivan, et al, U.S. Appl. No. 16/410,559, filed May 13, 2019 titled "Image Acquisition System for off-Axis Eye Images".

Non Final Office Action dated Jan. 10, 2020 for U.S. Appl. No. 16/379,348 "System for Performing Eye Detection and/or Tracking" Bigioi, 10 pages.

Office Action for U.S. Appl. No. 16/379,348, dated Jul. 24, 2020, Bigioi, "System for Performing Eye Detection and/or Tracking", 11 pages.

Beymer, D. et. al., "Eye gaze tracking using an active stereo head", Proceedings 2003 IEEE Computer Society Conference on Computer Vision and Pattern Recognition, vol. 2, Jun. 18, 2003, pp. 451-458.

EP Search Report for corresponding EP Patent Application No. 20162552.2 dated Sep. 8, 2020, 11 pages.

* cited by examiner

SYSTEM FOR PERFORMING EYE DETECTION AND/OR TRACKING

BACKGROUND

Many systems use eye tracking in order to determine gaze directions or other eye related attributes of users. For instance, such as in vehicles, a system may use a camera installed in a vehicle to capture images of users located within the vehicle. The system may then analyze the images to determine at least the gaze direction of the user driving the vehicle. A vehicle control system may then use the gaze direction to determine if the user is paying attention to the road while driving the vehicle. If the user is not paying attention to the road, the vehicle control system may output a sound or other alert to the user.

In many situations, these systems have problems performing eye tracking to determine the gaze direction or other eye related attributes of the user. For example, such as in large environments like the passenger compartments of vehicles, the camera may require a wide-angle lens to capture images that represent the environment. As such, only a small portion of the images may represent the eyes of the user, which can cause problems for the system analyzing the images using eye tracking. For instance, the system may be unable to identify the eyes of the user using the images. To compensate for this problem, some systems use high-resolution cameras to capture the images. However, using high-resolution cameras may increase processing load, which may increase latency, power consumption, and/or heat generated by the system.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
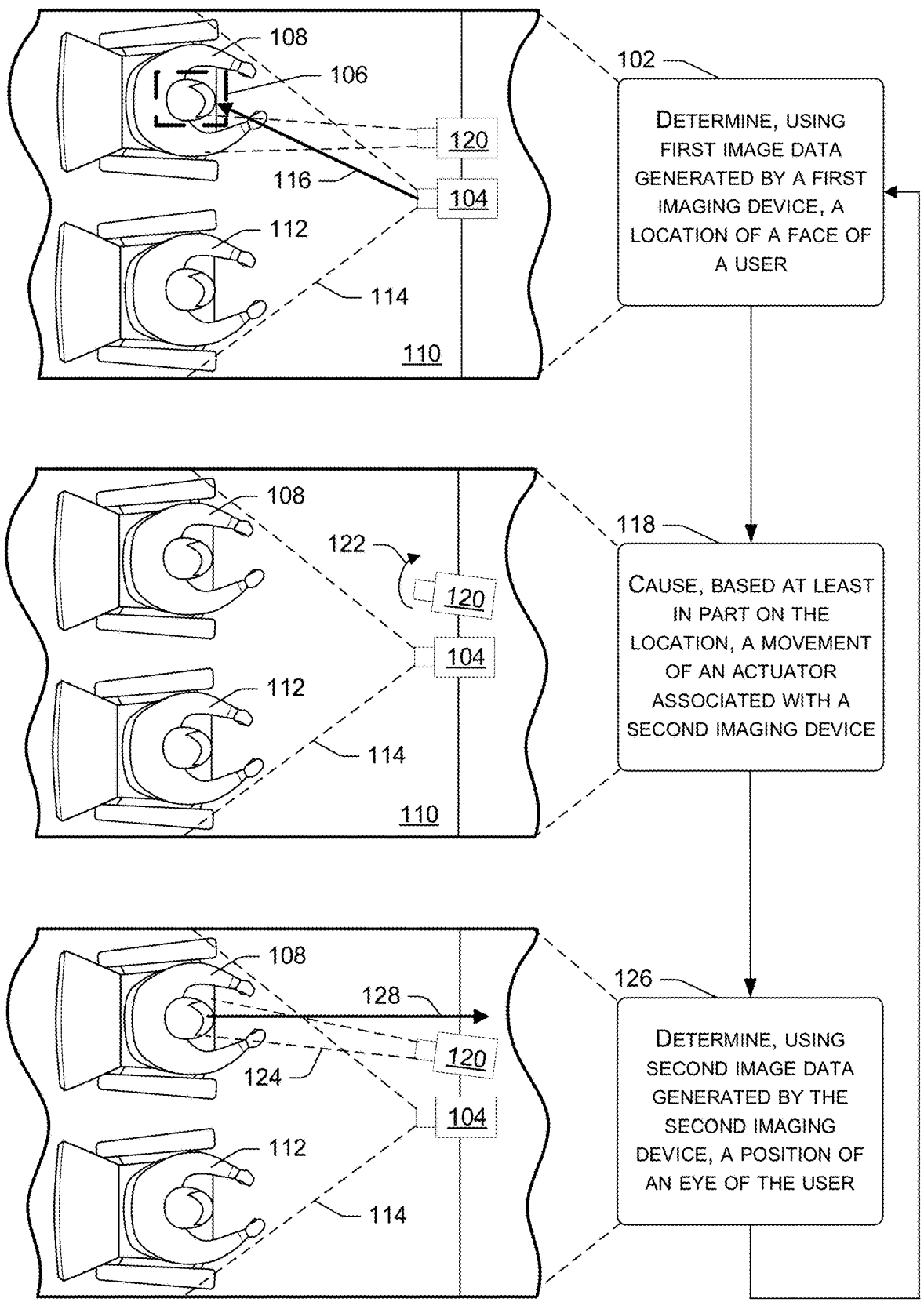
FIG. 1 illustrates an example process for performing eye tracking using multiple imaging devices.

As discussed above, conventional systems that perform eye tracking may use an imaging device, such as a camera, to generate images data representing images. The system may then analyze the image data to determine a gaze direction or other eye related attributes of a user. However, in many situations, such a system may have problems performing eye tracking and/or determining the gaze direction or other eye related attributes of the user. For example, such as when the system is installed in a passenger compartment of a vehicle, the imaging device may require a wide-angle lens to capture images that represent a large portion of the passenger compartment. As such, only a small portion of the image data may represent the eyes of the user, which can limit the system's ability to accurately detect and track the location of the user's eyes and/or gaze direction of the user. To compensate for this problem, some conventional systems use a high-resolution imaging device. However, by using the high-resolution imaging device, such systems typically suffer from higher processing loads to process the high-resolution image data for a wide field of view, which may increase latency, power consumption, and/or heat generated by the system.

This disclosure describes, in part, systems and techniques for performing eye tracking using multiple imaging devices. For instance, a system may include at least a first imaging device, a second imaging device, and an actuator that is configured to rotate the second imaging device. The first imaging device may include a first field of view (FOV) and the second imaging device may include a second FOV. In some instances, the first FOV is different than the second FOV. For example, the first FOV of the first imaging device may be greater than the second FOV of the second imaging device, such that the second FOV includes only a portion of the first FOV. However, the system may use the actuator to rotate the second imaging device such that the second imaging device can scan substantially all of the first FOV.

To perform the eye tracking, the system may generate image data (referred to, in these examples, as "first image data") using the first imaging device. The system may then analyze the first image data using one or more algorithms associated with face detection. Based on the analysis, the system may determine a location of a face of a user (e.g., a direction from the first imaging device to the face of the user). For example, based on the analysis, the system may determine that a portion of the first image data represents the face of the user. Each portion of the first image data may be associated with a respective location (and/or respective direction). As such, the system may determine the location (and/or the direction) based on which portion of the first image data represents the face of the user. While this is just one example of determining the location of the face of the user using face detection, in other examples, the system may use any other algorithms and/or techniques to analyze the first image data in order to determine the location of the face of the user.

The system may then use the location and/or direction of the face of the user to rotate the actuator from a first position to a second position. In the second position, a large portion of the second FOV of the second imaging device may include the face of the user. In other words, the system may use the location determined using the first image data to direct the second imaging device towards the face of the user. Additionally, in some examples, the second imaging device may include a light source that emits light. In such examples, the light source may also be directed towards the face of the user and may emit light in a limited area, such as an area proximate the face of the user. The system may then use the second imaging device to generate image data (referred to, in these examples, as "second image data"). In some instances, and since the second imaging device is directed towards the face of the user, a greater portion of the second image data may represent the face of the user as compared to the first image data. Also, in examples in which the light source emits light in a limited area, less power may be required for the light source than if a larger area (e.g., the passenger compartment or a field of view of the first imaging device) were illuminated.

The system may then analyze the second image data using one or more algorithms associated with eye tracking. Based on the analysis, the system may determine an eye position and/or in a first aspect, the system may determine a gaze direction of the user. For example, the system may analyze the second image data to identify the center(s) of the pupil(s) of the eye(s) of the user (e.g., the eye(s) position(s)). The system may additionally or alternatively analyze the second image data to determine the center(s) of the corneal reflection(s) created by the light emitted by the light source. Using the location of the face of the user, the center(s) of the pupil(s) of the eye(s), and/or the center(s) of the corneal reflection(s), the system may determine the gaze direction of the user. While this is just one example of determining the gaze direction of the user using eye tracking, in other examples, the system may use any other algorithms and/or techniques to analyze the second image data in order to determine the gaze direction of the user.

In some instance, the system may perform the techniques above in order to continuously or periodically track the eye position and/or gaze directions of the user. For instance, as the location of the face of the user changes, the system may continue to analyze first image data generated by the first imaging device to determine a new location of the face of the user. The system may then cause the actuator to move from the second position to a third position. While in the third position, the second imaging device and/or the light source may be directed towards the face of the user, which is now located at the new location. The system may then analyze second image data generated by the second imaging device to determine a new eye position and/or in a first aspect, the system may determine a new gaze direction of the user.

In some instances, the system may output data representing the locations of the face of the user, the eye positions of the user, and/or in a first aspect the gaze directions of the user to one or more computing devices. For instance, if the system is installed in or in communication with a vehicle, the system may output the data to one or more other computing devices installed in the vehicle (e.g., a vehicle drive system) and/or to one or more remote systems via a network connection. The one or more computing devices and/or remote system(s) may then process the data. For instance, the one or more computing devices may analyze the data in order to determine whether the user is paying attention to the road, whether the user is drowsy, whether the user sees an object in an environment of the vehicle, or the like. If the one or more computing devices determine that one of the these or other applicable conditions are present, then the one or more computing devices may cause an alert, such as a sound, vibration, or visible warning, to be output in order to warn the user.

In some instances, the system may be preinstalled within an environment, such as a passenger compartment of a vehicle. For instance, a manufacturer of the vehicle may preinstall the system into the vehicle and then calibrate the imaging devices based on locations of the imaging devices within the vehicle. In other instances, the system may not be preinstalled within an environment. For instance, the system may include standalone or aftermarket system that may be installed within various environments.

The second imaging device may be positioned at a known location relative to the first imaging device. In this way, based on the position of the face of the user relative to the first imaging device and the known location of the second imaging device relative to the first imaging device, the system can determine an angle from the second imaging device to the face of the user. In some instances, the second imaging device may be positioned close to the first imaging device. For instance, the second imaging device may be installed within a threshold distance to the first imaging device. The threshold distance may include, but is not limited to, 1 centimeter, 2 centimeters, ten centimeters, and/or the like. In other instances, the second imaging device may be spaced from the first imaging device. For instance, the second imaging device may be spaced a distance greater than the threshold distance from the first imaging device.

In some instances, when installing the system in a vehicle, the first image device and/or the second image device may be installed in a front portion of the vehicle. For instance, the first imaging device and/or the second imaging device may be installed in, on, or proximate to the dash of the vehicle, the rearview mirror of the vehicle, and/or any other location in which the first imaging device and/or the second imaging device can generate image data representing the eyes of the user driving the vehicle.

In some instances, by using the system that includes multiple imaging devices to perform eye tracking, the system improves previous systems which only use a single imaging device for performing eye tracking. For example, by directing the second imaging device towards the face of the user, a larger portion of the second image data generated by the second imaging devices represents the face and/or eyes of the user. This makes it easier for the system to analyze the second image data to determine the eye positions and/or in the first aspect gaze directions of the user, as compared to analyzing image data where only a small portion of the image data represents the face and/or eyes of the user. For another example, the system may be able to perform eye tracking using low-resolution imaging devices, which consume less power than a high-resolution imaging device. Not only does this reduce the amount of power consumed by the system, it also reduces the amount of heat that is dissipated by the system, which is important in enclosed or confined spaces such as a dash or rearview mirror of a vehicle.

FIG. 1 illustrates an example process for performing eye detection and/or tracking using multiple imaging devices. At 102, a system may determine, using first image data generated by a first imaging device 104, a location 106 of a face of a user 108. For instance, the first imaging device 104 may generate the first image data representing an environment 110. In the example of FIG. 1, the environment 110 may include an interior compartment of a vehicle that includes at least the user 108. In the illustrated example, the environment 110 includes an additional user 112. In other examples, the system may be used in an environment with any number of one or more users. As shown, the first imaging device 104 includes a first FOV 114 that includes both the user 108 and the additional user 112. To determine the location 106 of the face of the user 108, the system may analyze the first image data using one or more algorithms associated with face detection. Based on the analysis, the system may determine the location 106 of the face of the user 108 within the environment 110 relative to a location of the first imaging device 104.

In some instances, the system may determine the location 106 of the face of the user 108 since the user 108 is the driver of the vehicle. In such instances, the system may determine that the user 108 is the driver based on the relative location of the user 108 within the environment 110. For instance, the user 108 may be at a location within the environment 110 at which the driver would normally be located.

In some instances, the location 106 may represent a two-dimensional and/or three-dimensional location of the face of the user 108 within the environment 110. Additionally, or alternatively, in some instances, the location 106 may represent a direction 116 from the first imaging device 104 to the face of the user 108. In such instances, the direction 116 may include a two-dimensional vector and/or a three-dimensional vector. In some instances, the second imaging device 120 is placed close to the first imaging device 104 in order to minimize and/or eliminate a parallax error when adjusting the second imaging device 120, as described herein.

At 118, the system may cause, based at least in part on the location 106, a movement of an actuator associated with a second imaging device 120. For instance, the system may cause the actuator associated with the second imaging device 120 to move from a first position to a second position, which is illustrated by 122. While the actuator is in the second position, the second imaging device 120 may be directed towards the face of the user 108. For instance, a greater portion of a second FOV 124 of the second imaging device 120 may include the face of the user 108 as compared to the first FOV 114 of the first imaging device 118. Additionally, in some instances, the second imaging device 120 may include a light source. In such instances, while the actuator is in the second position, the light source may be directed towards the face of the face of the user.

At 126, the system may determine, using second image data generated by the second imaging device 120, a position of an eye of the user 108. For instance, the second imaging device 120 may generate the second image data, where the second image data represents at least the face of the user 108. The system may then analyze the second image data using one or more algorithms associated with eye tracking. Based on the analysis, the system may determine the position(s) of the eye(s) of the user 108. In some instances, and also based on the analysis, the system may further determine a gaze direction 128 of the user 108.

As further illustrated in the example of FIG. 1, the system may continuously or periodically perform the example process. For instance, the system may determine, using the first image data generated by the first imaging device 104, a new location of the face of the user 108. The system may then cause, based at least in part on the new location, an additional movement of the actuator associated with the second imaging device 120. Additionally, the system may determine, using the second image data generated by the second imaging device 120, a new position of the eye of the user 108 and/or a new gaze direction. In other words, the system may continue to track the eyes of the user 108 over time using the first imaging device 104 and the second imaging device 120.

Figure 2:
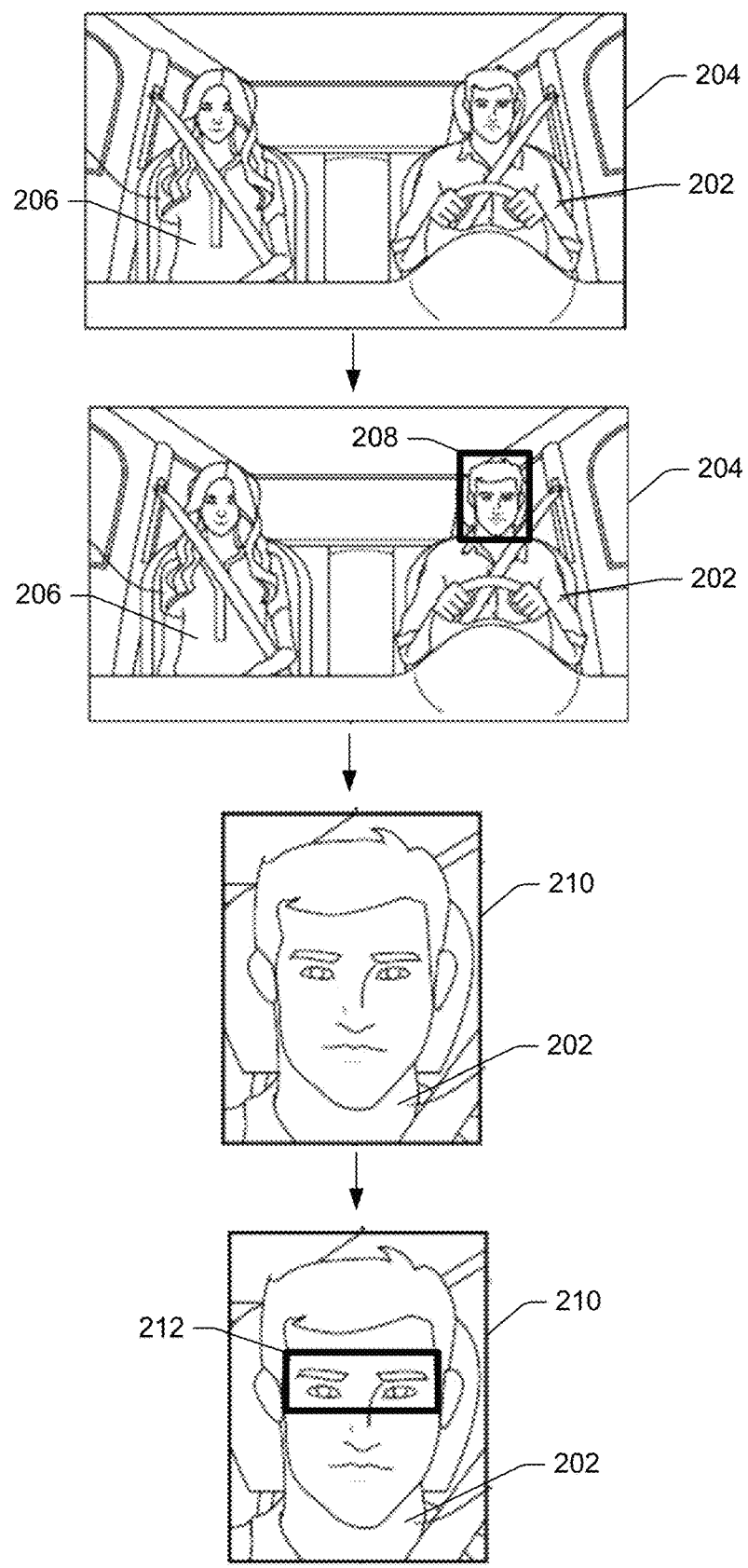
FIG. 2 illustrates an example of analyzing image data generated by multiple imaging devices in order to determine an eye position and/or gaze direction of a user.

FIG. 2 illustrates an example of analyzing image data generated by multiple imaging devices in order to determine an eye position and/or gaze direction of a user 202. For instance, a system may use a first imaging device may generate first image data. In the example of FIG. 2, the first image data represents at least one image 204 depicting at least the user 202 and an additional user 206. The system may then analyze the first image data using one or more algorithms associated with face detection. Based on the analysis, the system may determine a location 208 of the face of the user 202.

The system may then cause an actuator associated with a second imaging device to move from a first position to a second position, such that the second imaging device is directed towards the face of the user 202. While in the second position, the system may use the second imaging device to generate second image data. In the example of FIG. 2, the second image data represents only a portion of the first image data. For instance, the second image data represents at least one image 210 depicting the face of the user 202. As shown, a greater portion of the second image data represents the face of the user 202 as compared to the first image data.

The system may then analyze the second image data using one or more algorithms associated with eye tracking. Based on the analysis, the system may determine at least an eye portion 212 of the user 202 and/or a gaze direction of the user 202. In some instances, the system may then output data representing the location 208 of the face of the user 202, the eye position 212 of the user 202, and/or the gaze direction of the user 202.

Figure 3:
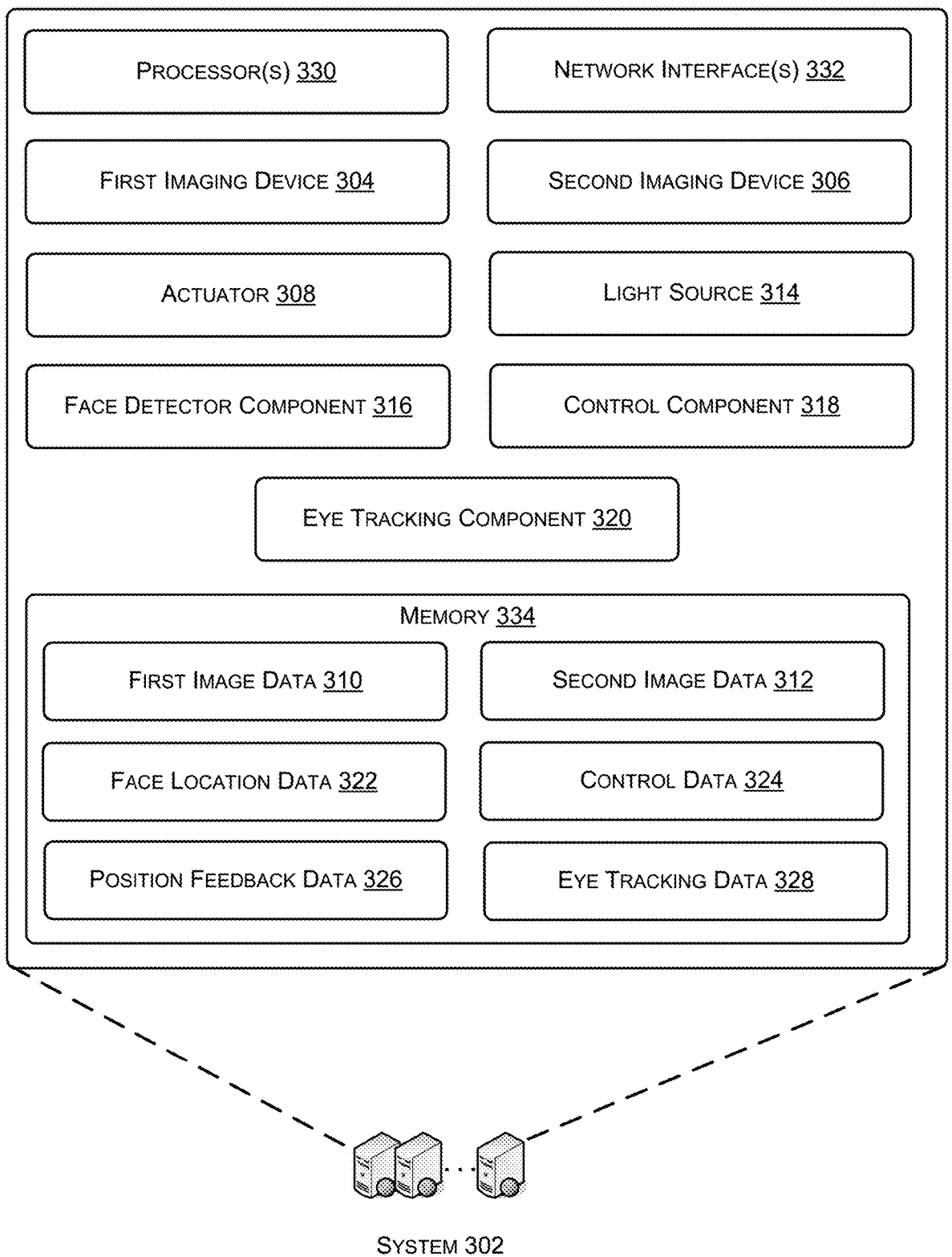
FIG. 3 illustrates a block diagram of an example system that uses multiple imaging devices for eye tracking.

FIG. 3 illustrates a block diagram of an example system 302 that uses multiple imaging devices for eye tracking. As shown, the system 302 includes at least a first imaging device 304 (which may represent, and/or be similar to, the first imaging device 104), a second imaging device 306 (which may represent, and/or be similar to, the second imaging device 120), and an actuator 308 that is configured to rotate the second imaging device 306. The first imaging device 304 may include a still image camera, a video camera, a digital camera, and/or any other type of device that generates first image data 310. In some instances, the first imaging device 304 may include a wide-angle lens that provides the first imaging device 304 with a wide FOV.

Additionally, the second imaging device 306 may include a still image camera, a video camera, a digital camera, and/or any other type of device that generates second image data 312. In some instances, the second imaging device 306 includes a large focal length and/or large depth of field lens that provides the second imaging device 306 with a smaller FOV as compared to the first imaging device 304. However, the system 302 may use the actuator 308 to rotate the second imaging device 306 such that the second imaging device 306 can scan an entirety of the FOV of the first imaging device 304.

For example, the actuator 308 may include any type of hardware device that is configured to rotate around one or more axis. The second imaging device 306 may attach to the actuator 308 such that, when the actuator rotates, the second imaging device 306 also rotates changing the view direction of the second imaging device 306. In some instances, a light source 314 may also be attached to the actuator 308 and/or attached to the second imaging device 306. In such instances, the actuator 308 may further rotate in order to change a direction at which the light source 314 emits light. For example, the light source 314 may emit the light in a direction that is similar to the direction at which the second imaging device 306 is generating the second image data 312, such that the light illuminates the FOV of the second imaging device 306. The light source 314 may include, but is not limited to, a light-emitting diode, an infrared light source, and/or any other type of light source that emits visible and/or non-visible light.

In some instances, a first frame rate and/or first resolution associated with the first imaging device 304 may be different than a second frame rate and/or second resolution associated with the second imaging device 306. In some instances, the first frame rate and/or the first resolution associated with the first imaging device 304 may be the same as the second frame rate and/or the second resolution associated with the second imaging device 306

As further illustrated in FIG. 3, the system 302 may include a face detector component 316, a control component 318, and an eye tracking component 320. The face detector component 316 may be configured to analyze the first image data 310 in order to determine a location of a face of a user. For example, the face detector component 316 may analyze the first image data 310 using one or more algorithms associated with face detection. The one or more algorithms may include, but are not limited to, neural network algorithm(s), Principal Component Analysis algorithm(s), Independent Component Analysis algorithms(s), Linear Discriminant Analysis algorithm(s), Evolutionary Pursuit algorithm(s), Elastic Bunch Graph Matching algorithm(s), and/or any other type of algorithm(s) that the face detector component 316 may utilize to perform face detection on the first image data 310.

In some instances, the location may correspond to a direction from the first imaging device 304 to the face of the user. For example, to determine the location of the face, the face detector component 316 analyzes the first image data 310 using the one or more algorithms. Based on analyses, the face detection component 316 may determine the direction from the first imaging device 310 to the face of the user. The direction may correspond to a two-dimensional vector and/or a three-dimensional vector from the first imaging device 304 to the face of the user. After determining the location of the face of the user, the face detector component 316 may generate face location data 322 representing the location of the face of the user.

The control component 318 may be configured to use the face location data 322 to move the actuator 308 from a current position to a new position. While in the new position, the second imaging device 306 and/or the light source 314 may be directed at the face of the user. For instance, while in the new position, a greater portion of the FOV of the second imaging device 306 may include the face of the user. Additionally, a greater portion of the light emitted by the light source 314 may be directed at the face of the user than at other objects located within a similar environment as the user. In some instances, to move the actuator 308, the control component 318 may determine the new position based on the location (e.g., the direction) represented by the location data 322.

For example, the control component 318 may use one or more algorithms to determine the new position for the actuator 308. In some instances, the one or more algorithms may determine new position based on the location (and/or direction) represented by the face location data 322, a location of the second imaging device 306, and/or a distance between the first imaging device 304 and the second imaging device 306. For example, the control component 318 may determine two-dimensional coordinates indicating a direction from the face to the first imaging device 304, determine a distance from the first imaging device 304 to the face, and convert the two-dimensional coordinates to a three-dimensional vector using the distance, where a specific distance along the vector gives the three-dimensional location of the face. The control component 318 may then determine a directional vector between the second imaging device 306 and the face using the three-dimensional vector, the location of the first imaging device 304, and the location of the second imaging device 306. Additionally, the control component 318 may convert the directional vector to polar coordinates that are used to drive the actuator 308. While this is just one example for determining the new position, the control component 318 may use any other techniques to determine the new position for the actuator 308.

After determining the position, the control component 318 may generate control data 324 that represents the new position for the actuator 308. In some instances, the control data 324 may represent the polar coordinates that are used to drive the actuator 308.

The actuator 308 and/or the second imaging device 306 may then use the control data 324 to move from the current position to the new position represented by the control data 324. Additionally, the actuator 308 and/or the second imaging device 306 may generate position feedback data 326 representing the current position of the actuator 308 and/or the second imaging device 306. In some instances, the control component 318 uses the position feedback data 326 to determine when the second imaging device 306 is directed towards the face of the user.

In some instances, to determine when the second imaging device 306 is directed towards the face of the user, the control component 318 may analyze the second image data 312 using similar processes as described above with respect to the first image data 310. Based on the analysis, the control component 318 may determine a directional vector between the second imaging device 306 and the face of the user. The control component 318 may then use the directional vector to determine polar coordinates. If the polar coordinates are the same as the polar coordinates determined using the first image data 310 (and/or within a threshold difference), then the control component 318 may determine that the second imaging device 306 is directed at the face of the user. However, if the polar coordinates are different (e.g., outside of the threshold difference), then the control component 318 may use the polar coordinates to further drive the actuator 308. In other words, the control component 318 may use similar techniques as described above with respect to the first image data 310 in order to further direct the second imaging device 306 at the face of the user.

The eye tracking component 320 may be configured to analyze the second image data 312 in order to determine eye position and/or a gaze direction of the user. For example, the eye tracking component 320 may analyze the second image data 312 using one or more algorithms associated with eye tracking. The one or more algorithms may include, but are not limited to, neural network algorithm(s) and/or any other types of algorithm(s) associated with eye tracking. The eye position may represent the three-dimensional position of the eye with respect to the second imaging device 306. Additionally, the gaze direction may represent a vector originating from the eye and expressed in a coordinate system associated with the second imaging device 306. After determining the eye position and/or gaze direction of the user, the eye tracking component 320 may generate eye tracking data 328 representing the eye position and/or gaze direction.

In some instances, the second imaging device 306 and/or the control component 318 may then use the eye position and/or gaze direction expressed in the coordinate system associated with the second imaging device 306, the location of the second imaging device 306, and/or the orientation of the second imaging device 306 to determine the eye position and/or gaze direction in a global coordinate system that is associated with the environment. For instance, the second imaging device 306 and/or the control component 318 may determine the eye position and/or gaze direction with respect to the passenger compartment of the vehicle.

As further illustrated in FIG. 3, the system 302 includes processor(s) 330, network interface(s) 332, and memory 334. As used herein, a processor, such as the processor(s) 330, may include multiple processors and/or a processor having multiple cores. Further, the processors may comprise one or more cores of different types. For example, the processors may include application processor units, graphic processing units, and so forth. In one instance, the processor may comprise a microcontroller and/or a microprocessor. The processor(s) 330 may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, the processor(s) 330 may possess its own local memory, which also may store program components, program data, and/or one or more operating systems.

The memory 334 may include volatile and nonvolatile memory, removable and non-removable media implemented in any method or technology for storage of information, such as computer-readable instructions, data structures, program component, or other data. The memory 334 includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory 334 may be implemented as computer-readable storage media ("CRSM"), which may be any available physical media accessible by the processor(s) 330 to execute instructions stored on the memory 334. In one basic instance, CRSM may include random access memory ("RAM") and Flash memory. In other instances, CRSM may include, but is not limited to, read-only memory ("ROM"), electrically erasable programmable read-only memory ("EEPROM"), or any other tangible medium which can be used to store the desired information and which can be accessed by the processor(s).

Further, functional components may be stored in the respective memories, or the same functionality may alternatively be implemented in hardware, firmware, application specific integrated circuits, field programmable gate arrays, or as a system on a chip (SoC). In addition, while not illustrated, each respective memory, such as the memory 334, discussed herein may include at least one operating system (OS) component that is configured to manage hardware resource devices such as the network interface(s), the I/O devices of the respective apparatuses, and so forth, and provide various services to applications or components executing on the processors. Such OS component may implement a variant of the FreeBSD operating system as promulgated by the FreeBSD Project; other UNIX or UNIX-like variants; a variation of the Linux operating system as promulgated by Linus Torvalds; the FireOS operating system from Amazon.com Inc. of Seattle, Wash., USA; the Windows operating system from Microsoft Corporation of Redmond, Wash., USA; LynxOS as promulgated by Lynx Software Technologies, Inc. of San Jose, Calif.; Operating System Embedded (Enea OSE) as promulgated by ENEA AB of Sweden; RTOS, QNX from Blackberry Limited; and so forth.

The network interface(s) 332 may enable the system 302 to send data to and/or receive data from other electronic device(s). The network interface(s) 332 may include one or more network interface controllers (NICs) or other types of transceiver devices to send and receive data over the network. For instance, the network interface(s) 332 may include a personal area network (PAN) component to enable messages over one or more short-range wireless message channels. For instance, the PAN component may enable messages compliant with at least one of the following standards IEEE 802.15.4 (ZigBee), IEEE 802.15.1 (Bluetooth), IEEE 802.11 (WiFi), or any other PAN message protocol. Furthermore, the network interface(s) 332 may include a wide area network (WAN) component to enable message over a wide area network. Moreover, the network interface(s) may enable the system 302 to communicate using a Controller Area Network bus.

The operations and/or functionalities associated with and/or described with respect to the components of the system 302 may be performed utilizing cloud-based computing resources. For example, web-based systems such as Elastic Compute Cloud systems or similar systems may be utilized to generate and/or present a virtual computing environment for performance of some or all of the functionality described herein. Additionally, or alternatively, one or more systems that may be configured to perform operations without provisioning and/or managing servers, such as a Lambda system or similar system, may be utilized.

Although the example of FIG. 3 illustrates each of the face detector component 316, the control component 318, and the eye tracking component 320 as including hardware components, in other examples, one or more of the face detector component 316, the control component 318, and the eye tracking component 320 may include software stored in the memory 334. Additionally, although the example of FIG. 3 illustrates the face detector component 316 as being separate from the first imaging device 304 and the eye tracking component 320 as being separate from the second imaging device 306, in other examples, the face detector component 316 may be included in the first imaging device 304 and/or the eye tracking component 320 may be included in the second imaging device 306.

Furthermore, although the example of FIG. 3 illustrates the second imaging device 306, the actuator 308, and/or the light source 314 as including separate components, in other examples, the second imaging device 306 may include the actuator 308 and/or the light source 314.

As described herein, a machine-learned model which may include, but is not limited to a neural network (e.g., You Only Look Once (YOLO) neural network, VGG, DenseNet, PointNet, convolutional neural network (CNN), stacked auto-encoders, deep Boltzmann machine (DBM), deep belief networks (DBN),), regression algorithm (e.g., ordinary least squares regression (OLSR), linear regression, logistic regression, stepwise regression, multivariate adaptive regression splines (MARS), locally estimated scatterplot smoothing (LOESS)), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, Hopfield network, Radial Basis Function Network (RBFN)), supervised learning, unsupervised learning, semi-supervised learning, etc. Additional or alternative examples of neural network architectures may include neural networks such as ResNet50, ResNet101, VGG, DenseNet, PointNet, and the like. Although discussed in the context of neural networks, any type of machine-learning may be used consistent with this disclosure. For example, machine-learning algorithms may include, but are not limited to, regression algorithms, instance-based algorithms, Bayesian algorithms, association rule learning algorithms, deep learning algorithms, etc.

Figure 4:
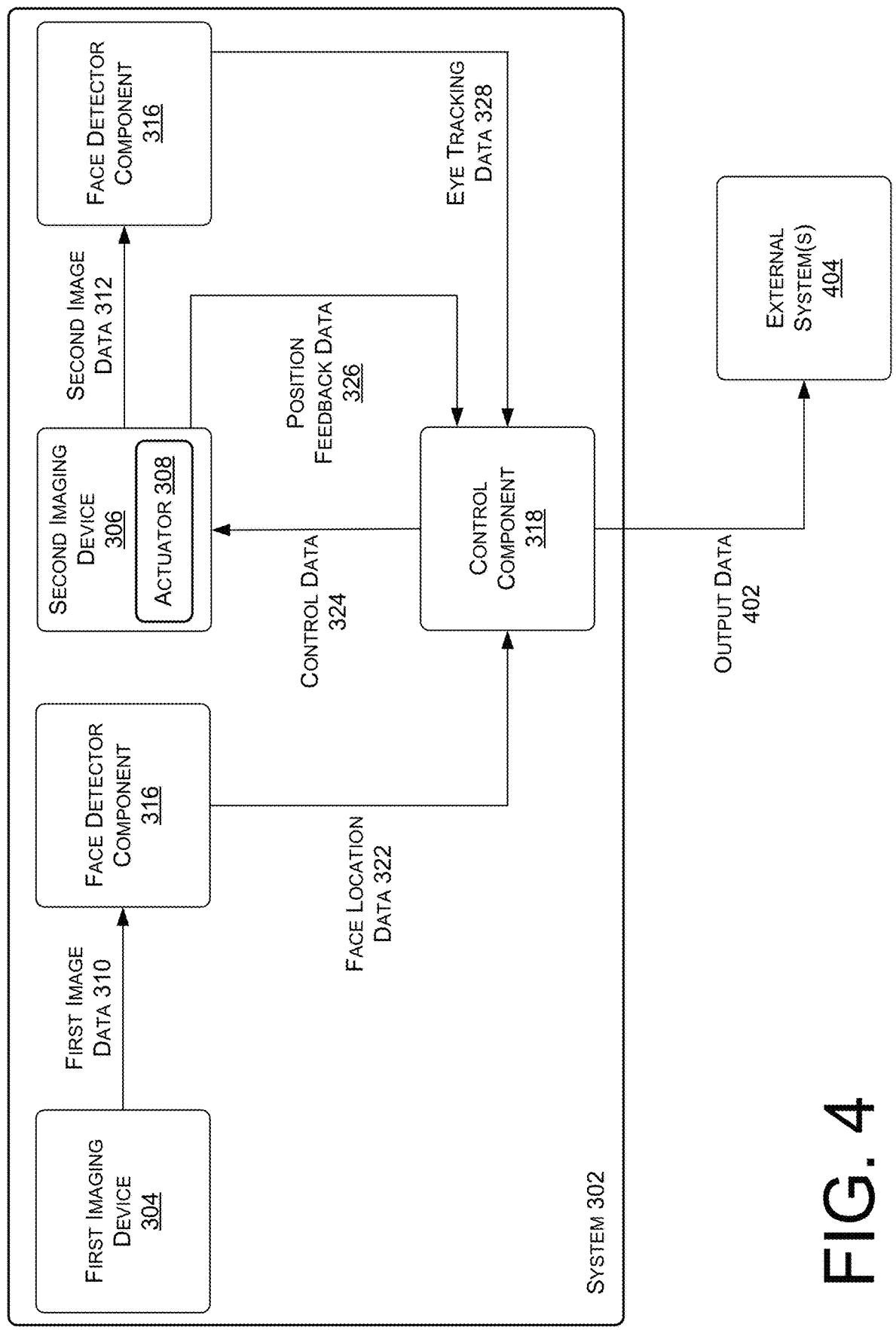
FIG. 4 illustrates an example diagram representing a system performing eye tracking.

FIG. 4 illustrates a diagram representing an example of the system 302 performing eye tracking. As shown, the first imaging device 304 may generate the first image data 310 and then send the first image data 310 to the face detector component 316. The face detector component 316 may then analyze the first image data 310 to determine the location of the face of the user. Additionally, the face detection component 316 may generate the face location data 322 representing the location and send the face location data 322 to the control component 318.

The control component 318 may use the face location data 322 in order to generate the control data 324, where the control data 324 represents a new position for the second imaging device 306. The control component 318 may then send the control data 324 to the second imaging device 306 (and/or the actuator 308). Based on receiving the control data 324, the actuator 308 of the second imaging device 306 may move from a current position to the new position. While the actuator is in the new position, the second imaging device 306 may send position feedback data 326 to the control component 318, where the position feedback data 326 indicates that the actuator 308 is in the new position. Additionally, the second imaging device 306 may generate the second image data 312 representing at least the face of the user. The second imaging device 306 may then send the second image data 312 to the face detector component 316.

The face detector component 316 may analyze the second image data 312 to determine the eyes positions and/or the gaze direction of the user. The face detector component 316 may then generate eye tracking data 328 representing the eyes positions and/or the gaze direction and send the eye tracking data 328 to the control component 318. In some instances, the control component 318 uses the eye tracking data 328, as well as new face location data 322, to determine a new position for the second imaging device 306.

As further illustrated in the example of FIG. 4, the control component 318 may send the output data 402 to external system(s) 404. The output data 402 may include, but is not limited to, the face location data 322 and/or the eye tracking data 328. In some instances, the external system(s) 404 may be included in a similar device as the system 302. For instance, the system 302 may be installed in or on a vehicle and the external system(s) 404 may include a vehicle control system. In some instances, the external system(s) 404 may include a remote system (e.g., a fleet monitoring service to monitor drivers, a remote image analysis service, etc. In such instances, the system 302 may send the output data 402 to the external system(s) 404 over a network.

Figure 5:
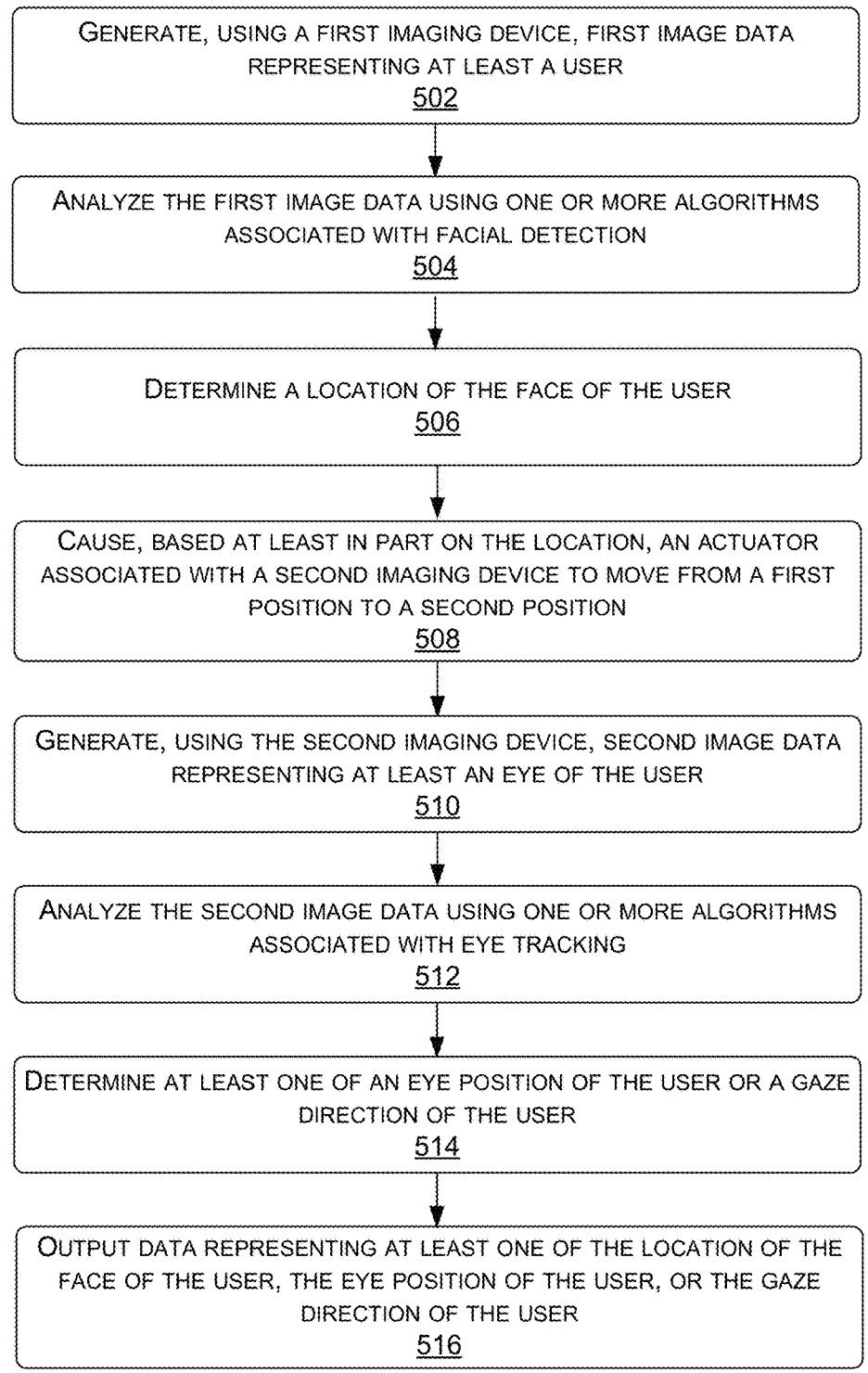
FIG. 5 illustrates an example process for using multiple imaging devices to perform eye tracking.
Figure 6:
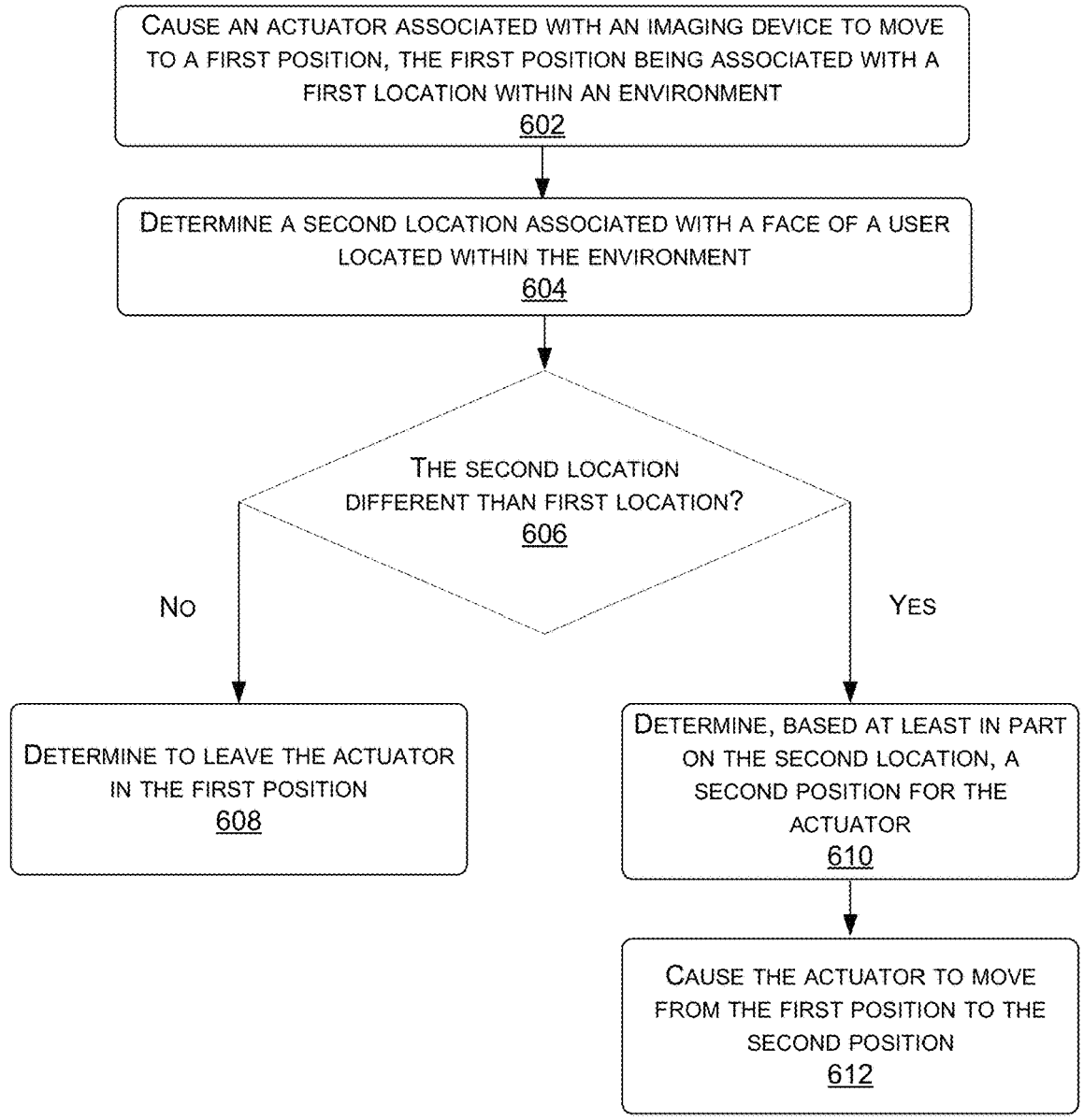
FIG. 6 illustrates an example process for determining when to adjust an actuator of an imaging device that is being used for eye tracking.

FIGS. 5-6 illustrate example processes for performing eye tracking. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed.

FIG. 5 illustrates an example process 500 for using multiple imaging devices to perform eye tracking. At 502, a system may generate, using a first imaging device, first image data representing at least a user. In some instances, the first imaging device may include a first FOV, a first resolution, and/or a first frame rate. In some instances, the system may be installed within a vehicle. For instance, the first imaging device may be installed in a front portion of the vehicle, such as the dashboard. The first image data may then represent the passenger compartment of the vehicle, which includes at least the user (e.g., the driver).

At 504, the system may analyze the first image data using one or more algorithms associated with facial detection and at 506, the system may determine a location of the face of the user. In some instances, the location may represent a direction from the first imaging device to the face of the user. For instance, the location may represent a two-dimensional vector or a three-dimensional vector indicating the direction from the first imaging device to the face of the user. In some instances, the system determines the location based on which portion of the first image data represents the face of the user.

At 508, the system may cause, based at least in part on the location, an actuator associated with a second imaging device to move from a first position to a second position. For instance, the actuator may rotate along one or more axis to move from the first position to the second position. While in the second position, the second imaging device may be directed towards the face of the user. Additionally, in some examples, while in the second position, a light source may be directed towards the face of the user.

At 510, the system may generate, using the second imaging device, second image data representing at least an eye of the user. For instance, once the actuator is in the second position, the second imaging device may generate the second image data. In some instances, the second imaging device may include a second FOV, a second resolution, and/or a second frame rate. At least one of the second FOV may be different than the first FOV, the second resolution may be different than the first resolution, or the second frame rate may be different than the first frame rate. In some instances, such as when the system is installed in the vehicle, the second imaging device may also be installed in the front portion of the vehicle, such as the dashboard.

At 512, the system may analyze the second image data using one or more algorithms associated with eye tracking and at 514, the system may determine at least one of an eye position of the user or a gaze direction of the user.

At 516, the system may output data representing at least one of the location of the face of the user, the eye position of the user, or the gaze direction of the user. In some instances, the system may send the data to another system located in a similar device as the system. For instance, if the system is installed in the vehicle, the system may send the data to a vehicle drive system. In some instances, the system may send the data to a remote system over a network connection. In some instances, the system may continue to perform the example process 500 in order to track the eyes of the eyes.

FIG. 6 illustrates an example process 600 for determining when to adjust an actuator of an imaging device that is being used for eye tracking. At 602, a system may cause an actuator associated with an imaging device to move to a first position, the first position being associated with a first location within an environment. In some examples, the system may cause the actuator to move to the first position based on determining that a face of a user is located at the first location. In some instances, the first location may be based on a first direction from another imaging device to the face of the user.

At 604, the system may determine a second location associated with a face of a user located within the environment. In some instances, the system may determine the second location by analyzing, using one or more algorithms associated with face detection, image data generated by the other imaging device. In some instances, the system may determine the second location based on receiving, from an electronic device, data indicating the second location. In either instance, the second location may be based on a second direction from the other imaging device to the face of the user.

At 606, the system may determine whether the second location is different than the first location. For instance, the system may compare the second location to the first location. In some instances, comparing the second location to the first location may include comparing the second direction to the first direction. Based on the comparison, the system may determine whether the second location is different than the first location. In some instances, the system may determine that the second location is different than the first location based on a difference between the second direction and the first direction exceeding a threshold in any dimension. The threshold may include, but is not limited to, one degree, five degrees, ten degrees, and/or the like.

If at 606, the system determines that the second location is not different than the first location, then at 608, the system may determine to leave the actuator in the first position. For instance, if the system determines that the second location is not different than the first location, then the system may determine that the imaging device is still directed towards the face of the user. As such, the system may determine not to move the actuator in order to change the direction of the imaging device. The system may then analyze image data generated by the imaging device in order to determine an eye position and/or gaze direction of the user.

However, if at 606, the system determines that the second location is different than the first location, then at 610, the system may determine, based at least in part on the second location, a second position for the actuator. For instance, if the system determines that the second location is different than the first location, then the system may determine that the imaging device is no longer directed towards the face of the user. The system may then determine the second position such that the imaging device is directed towards the face of the user, which is now located at the second position. In some instances, the system determines the second position based at least in part on the second location, a location of the other imaging device within the environment, and/or a location of the imaging device within the environment.

At 612, the system may cause the actuator to move from the first position to the second position. As discussed above, when the actuator is at the second position, the imaging device may be directed towards the face of the user, which is located at the second location. Once the actuator is in the second position, the system may analyze image data generated by the imaging device to determine the eye position and/or gaze direction of the user. In some instances, the system may then continue to the example process 600 in order to keep the imaging device directed towards the face of the user.

Referring back to FIGS. 1-3, in a second aspect of the present invention, as an alternative or in addition to being concerned with a gaze direction of the user 108, 202 respectively, the FOV 124 of the second imaging device 120, 306 is narrow enough and the resolution of the optical system for the second imaging device 120, 306 is sufficiently high to provide enough image information from the eye region of the user 108, 202 to enable a diameter of one or more of the pupils of the user 108, 202 to be measured. Methods for analyzing portions of images such as the region 212 in FIG. 2 for iris regions and for identifying pupil boundaries are disclosed in U.S. patent application Ser. No. 16/410,559 (Ref: FN-643) filed on 13 May 2019 and entitled "Image acquisition system for off-axis eye images", the disclosure of which is incorporated herein by reference.

In such embodiments, it can be beneficial for the light source 314 to emit infra-red (IR) or near-IR light and for at least the second imaging device 120, 306 to be sensitive to the wavelengths of light emitted by the light source 314. Once the second imaging device 120, 306 and the light source 314 are directed towards the face of the user 108, 202, successive IR images provided by the second imaging device 120, 306 can provide a clear image of the user's pupils even in low ambient light conditions so enabling pupil size and location to be tracked over time.

In embodiments, one or both of the first imaging device 104, 304 or the second imaging device 120, 306 are sensitive to visible light wavelengths. This can be enabled by providing a Bayer filter type image sensor within the required device where pixels are divided into respective RGB and IR sub-pixels or alternatively, White-IR pixel sensors can be employed.

In any case, visible light spectrum image information received from one or both of the first imaging device 104, 304 or the second imaging device 120, 306 is used to measure the amount of light falling on the user's face, especially the eye region 212.

In particular, where the first imaging device 104, 304 is configured to be sensitive to visible light, this device can be configured to acquire a plurality of images, each at increasing exposure times for any given exposure time of the second imaging device 120, 306. These techniques are typical for producing high dynamic range (HDR) images which avoid saturation in very unevenly lit scenes. Using such HDR component images enables unsaturated image information to be extracted from the face region of the user 108, 202, so avoiding errors in measuring changes in light level illuminating the user's face.

Knowing the distance of the user's face from the imaging device providing the information, as well as the gain and exposure parameters for the imaging device, the illumination of the user's face and especially their eye region 212 can be determined for any given acquired image.

Note that in variations of the above described implementation, instead of the imaging device(s) providing illumination information, a photosensor (not shown) with a lens can be used to measure the visible light intensity falling on the user' face including the eye region 212. The field of view for the photosensor should be small enough to be limited to the user's face and to exclude any background. Thus, the photosensor can be mounted in the same housing as the second imaging device 120, 306 so that it also moves and constantly monitors the same part of the environment 110 as the second imaging device 120, 306.

In any case, illumination levels of the user's face including the eye region 212 can then be correlated with pupil size to determine the response of the user to changing light levels incident on their face.

This allows the system 302 and in particular variations of the eye tracking component 320 to track and one or more of: immediate response to any step change illumination of the user's face, short-term adaptation of the pupil size to illumination level and long-term adaptation of pupil size to illumination level.

The eye tracking component 320 itself or indeed any other component such as the control component 318 which is provided with this data can then determine if any of these responses are within a nominal limit for a given user taking into account age, sex, ethnicity and any other relevant information.

If not, then the control component 318 or any component which makes such a determination can signal to external systems such as vehicle control system 404 that the user may not be in a suitable state to be controlling the vehicle and appropriate actions can be taken including restricting the speed of the vehicle and/or ensuring the vehicle can be brought to a safe halt.

In variations of the above described embodiment, the second imaging device 120, 306 could comprise as an alternative to or an addition to a near infra-red (NIR) camera, a narrow field of view thermal camera focused only on a single eye.

In the above described embodiment, the component making the determination as to whether a user's pupil response to changes in light was inside a nominal limit or not, was operating continuously during operation of a vehicle and the changes in light level would typically be caused by changes in ambient light level including changes in road lighting.

In variations of the described embodiment, a visible light illuminator (not shown) may be provided and can be directed to illuminate the face of at least the user 108, 202. So, for example, the illuminator may be actuated by the control component 318 or any other suitable component to emit a light flash of known intensity before the car is started to test the driver's pupil reaction time in order to detect intoxication. Again, if the driver's pupil reaction is outside nominal limits, the control component 318 or any component which makes such a determination can signal to external systems such as vehicle control system 404 that the user may not be in a suitable state to be controlling the vehicle and appropriate actions can be taken.

Another function of actuating such a visible light illuminator either while a vehicle is being driven or while it is stationary can be the induction of the blink reflex in any of the users 108, 202 or 112, 206 synchronized with the deployment of one or more respective airbags for the or each user to minimize a chance of eye injury by the debris thrown by the airbag(s) in the event of an accident.

In still further variations of the above described embodiment, iris information can be extracted from the image data acquired by the second imaging device 120, 306 and provided to a biometric authentication unit, for example, as described in US-2019-364229 (Ref: FN-629), the disclosure of which is incorporated herein by reference, in order to authenticate a user and either to permit the user to control one or more of the functions of the vehicle or to access the user's personal information, such as their age etc. to assist in deciding if they can be permitted to control the vehicle.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims.

CONCLUSION

While various examples and embodiments are described individually herein, the examples and embodiments may be combined, rearranged and modified to arrive at other variations within the scope of this disclosure.

Although embodiments have been described in language specific to structural features and/or methodological acts, it is to be understood that the disclosure is not necessarily limited to the specific features or acts described. Rather, the specific features and acts are disclosed herein as illustrative forms of implementing the claimed subject matter. Each claim of this document constitutes a separate embodiment, and embodiments that combine different claims and/or different embodiments are within the scope of the disclosure and will be apparent to those of ordinary skill in the art after reviewing this disclosure.

What is claimed is:

1. A method comprising:
repeating at successive image generating times:
generating, using a first imaging device, first image data representing a user, the first imaging device coupled to a vehicle and configured to image the user when in a driving position for the vehicle;
determining that a portion of the first image data represents a face of the user;
causing, based at least in part on the portion of the first image data, an actuator associated with a second imaging device to move from a first position to a second position, the second imaging device coupled to the vehicle;
generating, using the second imaging device, second image data representing at least an eye of the user;
determining, based at least in part the second image data, a size of at least one pupil of the user;
determining a visible light level incident on the user; and
outputting third image data indicating a change in the size of at least one pupil relative to a change in the visible light level from one image generating time to another when the vehicle is in motion.

2. The method as recited in claim 1, said method further comprising:
performing generating the second image data representing at least the eye of the user when the vehicle is stationary;
actuating a visible light source directed toward said user to cause a step change in visible light level incident on said user; and
generating fourth image data representing at least the eye of the user at least once after said visible light source is actuated.

3. The method as recited in claim 1, wherein said change in the visible light level comprises one or more of: a user's immediate response to any step change illumination of the face of the user, a short-term adaptation of the size of at least one pupil to illumination level; and a long-term adaptation of the size of at least one pupil to illumination level.

4. The method as recited in claim 3 wherein said change in the visible light level takes into account at least one or more of a user's: age, sex or ethnicity.

5. The method as recited in claim 1 wherein at least one of said first imaging device or said second imaging device comprises a camera sensitive to at least visible wavelengths.

6. The method as recited in claim 1 wherein the second imaging device comprises a camera sensitive to at least infra-red wavelengths.

7. The method as recited in claim 5 further comprising using visible wavelength image data to determine said visible light level incident said user.

8. The method as recited in claim 1 comprising using a single-cell illumination sensor directed at said user to determine said visible light level incident said user.

9. The method as recited in claim 1 wherein said first image data comprises a plurality of image data, each acquired at successively longer exposure times at around the first time.

10. The method as recited in claim 1 wherein said second imaging device comprises a thermal camera configured to image only a single eye region of said user.

11. The method as recited in claim 2 comprising:
responsive to determining that said vehicle is likely to be involved in an accident, actuating said visible light source to induce at least said user to blink while at least one vehicle airbag is deployed.

12. The method as recited in claim 1, further comprising:
determining, based at least in part on the portion of the first image data, a direction of the face of the user,
wherein causing the actuator to move from the first position to the second position is based at least in part on the direction.

13. The method as recited in claim 1, further comprising emitting, using a light source associated with the second imaging device, light towards the face of the user.

14. The method as recited in claim 1, further comprising determining the second position for the actuator based at least in part on the portion of the first image data.

15. The method as recited in claim 1, wherein:
the first image data further represents a first field of view (FOV) of the first imaging device;
the second image data further represents a second FOV of the second imaging device; and
the second FOV is smaller than the first FOV.

16. The method as recited in claim 1, wherein:
generating the first image data comprises generating, using the first imaging device, the first image data using a first frame rate and a first resolution;
generating the second image data comprises generating, using the second imaging device, the second image data using a second frame rate and a second resolution; and
at least one of the first frame rate is different than the second frame rate or the first resolution is different than the second resolution.

17. The method as recited in claim 1, further comprising:
generating, using the first imaging device, fourth image data representing the user;
determining that a portion of the fourth image data represents the face of the user;
causing, based at least in part on the portion of the fourth image data, the actuator associated with the second imaging device to move from the second position to a third position;
generating, using the second imaging device, fifth image data representing at least the eye of the user;
determining, based at least in part the fifth image data, an eye position of the user; and
outputting sixth image data associated with the eye position of the user.

18. A system comprising:
a first imaging device;
a second imaging device;
an actuator for positioning the second imaging device;
one or more processors; and
one or more computer-readable media storing instructions that, when executed by the one or more processors, cause the one or more processors to perform operations comprising:
repeating at successive image generating times:
generating, using a first imaging device, first image data representing a user;
determining that a portion of the first image data represents a face of the user;
causing, based at least in part on the portion of the first image data, an actuator associated with a second imaging device to move from a first position to a second position;
generating, using the second imaging device, second image data representing at least an eye of the user;
determining, based at least in part the second image data, a size of at least one pupil of the user;
determining a visible light level incident on the user;
determining that a change in the visible light level incident on the user is within a nominal limit; and
outputting, based at least in part on the change in the visible light level being within the nominal limit, data indicating a change in the size of at least one pupil relative to the change in the visible light level from one image generating time to another.

19. The system of claim 18, wherein the change in the visible light level takes into account at least one or more of a user's: age, sex or ethnicity.

20. A system comprising:
a first imaging device;
a second imaging device;
an actuator for positioning the second imaging device;
one or more processors; and
one or more computer-readable media storing instructions that, when executed by the one or more processors, cause the one or more processors to perform operations comprising:
repeating at successive image generating times:
generating, using a first imaging device, first image data representing a user;
determining that a portion of the first image data represents a face of the user;
causing, based at least in part on the portion of the first image data, an actuator associated with a second imaging device to move from a first position to a second position;
generating, using the second imaging device, second image data representing at least an eye of the user;
determining, based at least in part the second image data, a size of at least one pupil of the user;
determining a visible light level incident on the user; and
outputting data indicating a change in the size of at least one pupil relative to a change in the visible light level from one image generating time to another, wherein the change in the visible light level is based at least in part on one or more of a user's: age, sex or ethnicity.

21. The system of claim 20, the operations further comprising:
   determining that the change in the visible light level incident on the user is within a nominal limit, and
   wherein outputting the data is based at least in part on the change in the visible light level being within the nominal limit.

* * * * *